Sept. 26, 1944. B. F. LANGER ET AL 2,359,125
DEVICE FOR MEASUREMENT OF THRUST AND TORQUE IN PROPELLER SHAFTS
Filed July 12, 1940 2 Sheets-Sheet 1
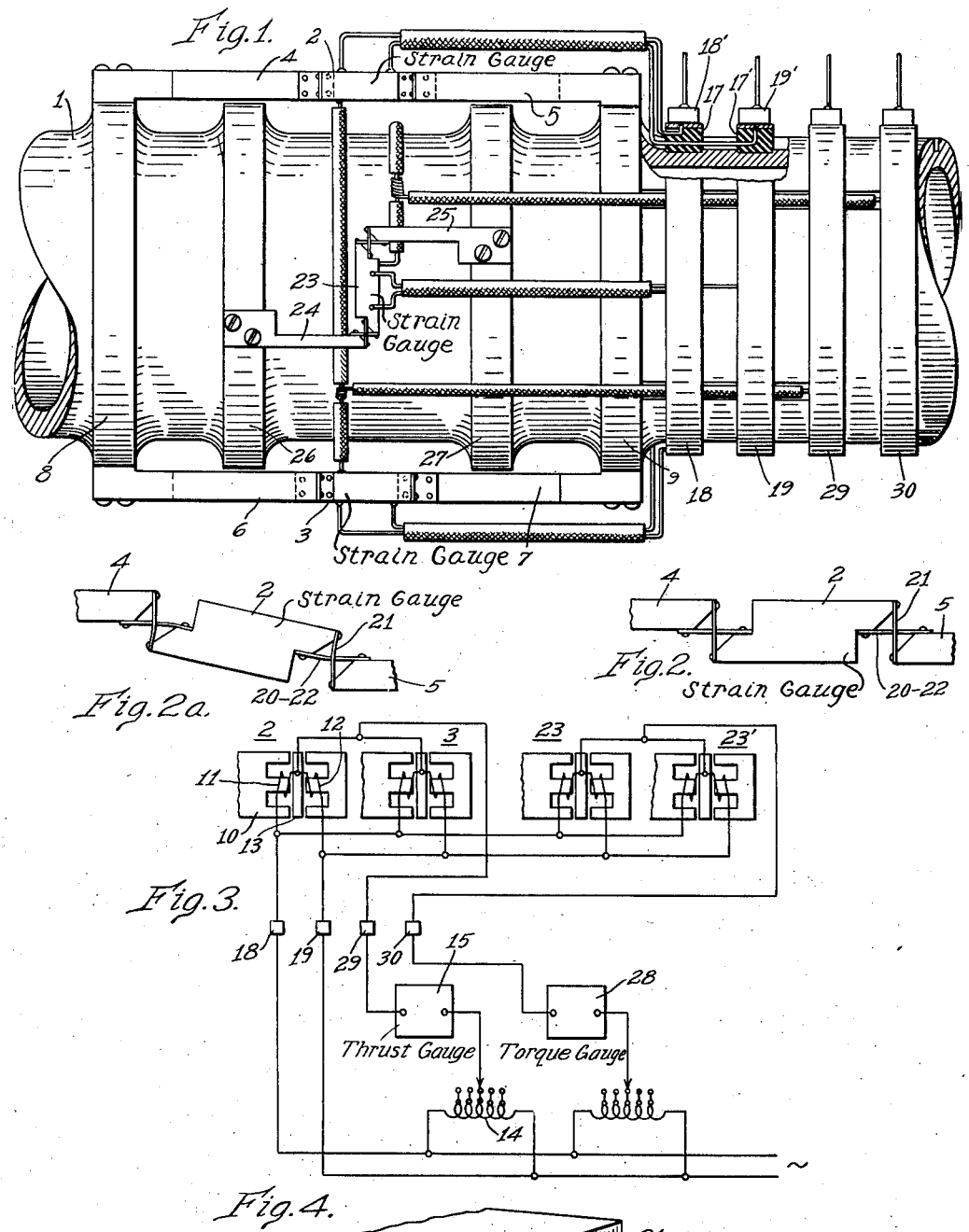

Patented Sept. 26, 1944

2,359,125

UNITED STATES PATENT OFFICE 2,359,125

DEVICE FOR MEASUREMENT OF THRUST AND TORQUE IN PROPELLER SHAFTS

Bernard F. Langer, Pittsburgh, and Harry C. Werner, Forest Hills, Pa., assignors to Westinghouse Electric & Manufacturing Company, East Pittsburgh, Pa., a corporation of Pennsylvania Application July 12, 1940, Serial No. 345,090

7 Claims. (Cl. 73—88)

Our invention relates to a metering device for measuring torque and thrust either singly or simultaneously of a drive shaft.

In many applications wherein a drive shaft drives a propeller such as in ships and in airplanes, it is extremely important to know the simultaneous values of torque and thrust in order to correctly design the pitch and other such details of the propeller blades so as to design for maximum efficiency, that is, maximum forward thrust for a particular propeller torque at a particular speed.

An object of our invention is to provide means including a magnetic strain gauge and electrical bridge circuit for measuring simultaneously the values of torque and thrust of a drive shaft at any particular instant.

Another object of our invention is to provide a novel means of mounting magnetic strain gauges so as to obtain simultaneous readings of thrust and torque or to obtain singly the reading of either thrust or torque.

Another object of our invention is to provide a metering device for measuring thrust and/or torque of a propeller which is simple in character, very rugged, but highly reliable and accurate in operation.

Still another object of our invention is to measure thrust horsepower and torque horsepower of a propeller shaft and the ratio of the former to the latter, namely, the efficiency of the propeller.

Other objects and advantages will become more apparent from a study of the following specification when considered in conjunction with the accompanying drawings, in which:

Figure 1 is a side view partly in cross section of a propeller drive shaft showing the means of mounting the magnetic strain gauges;

Fig. 2 is a top view of elements of a strain gauge which indicates thrust showing yieldable means for supporting the relatively movable parts of the strain gauge to arms which are secured to spaced portions of the drive shaft;

Fig. 2a is the same as Fig. 2 except that the arms are relatively displaced as the result of torque on the drive shaft.

Fig. 3 is a schematic showing of a control system showing an electrical bridge which measures the relative movement between the parts of the strain gauge;

Fig. 4 is an enlarged perspective view showing the yieldable interconnecting means between one of the relatively movable parts of the strain gauge and an arm which is secured to a portion of the drive shaft and is, in effect, another view of the structure shown in Fig. 2.

Figure 5:
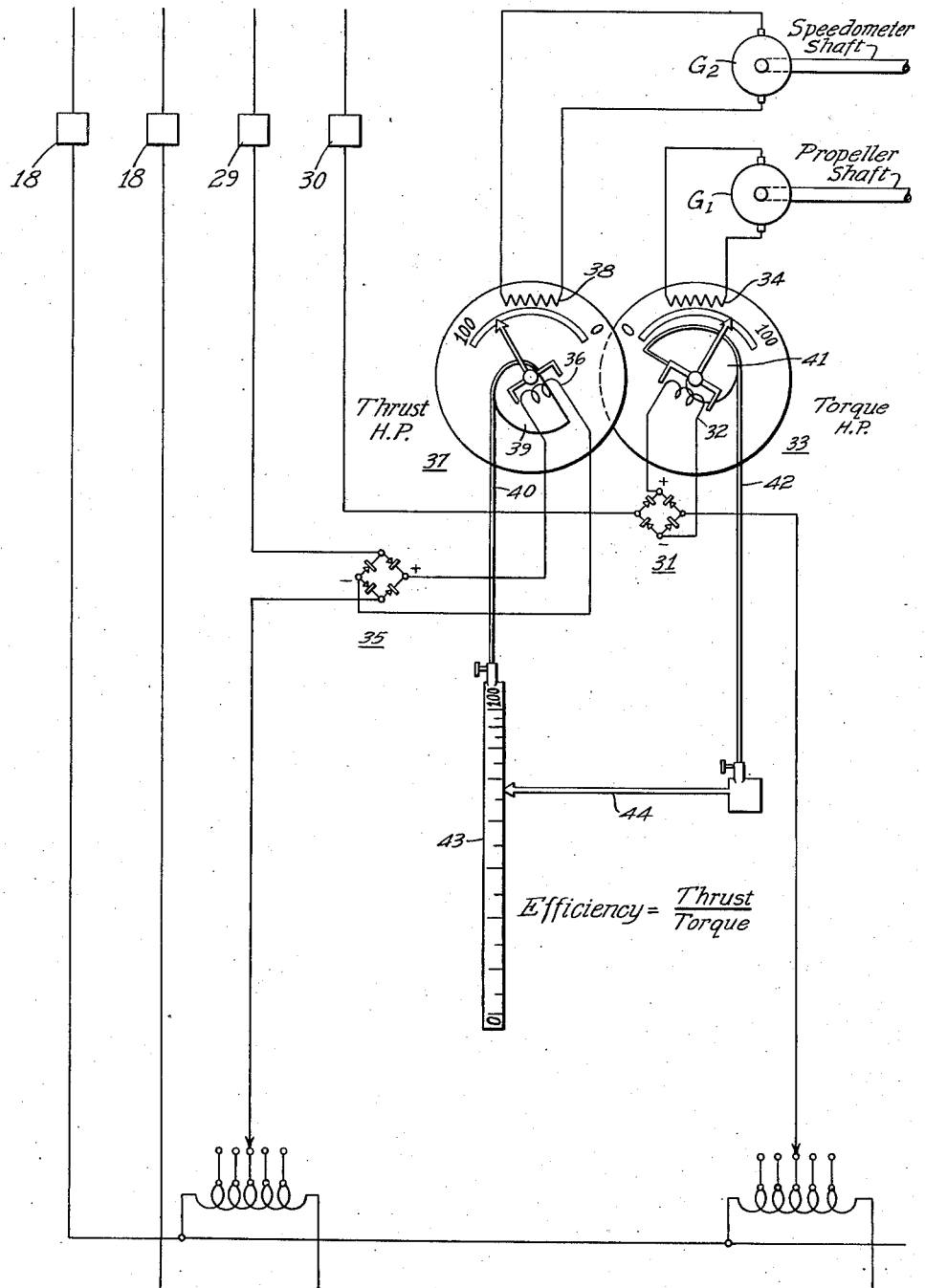
Fig. 5 is a schematic showing of a system in accordance with our invention for reading horsepower and efficiency.

In the testing of propellers to determine the correct angle or pitch of the blades and other features of propeller blade design, it is extremely important to measure torque applied to the propeller shaft and the axial compression of the shaft produced by propellers simultaneously. In accordance with our invention, we mount magnetic strain gauges on the drive shaft in such a manner that they will indicate relative displacement between portions of the drive shaft so as to be a measure of either torque or thrust or both torque and thrust, as will appear more clearly hereinafter.

Referring more particularly to Figure 1, numeral 1 denotes a propeller drive shaft, a portion of which is hollow in construction, that is, the portion shown in the drawings, upon which is mounted the strain gauge assemblies. A pair of magnetic strain gauges 2 and 3 are mounted on diametrically opposite sides of the drive shaft by means of arms 4—5, and 6—7, respectively, which arms are rigidly secured to outstanding annular portions 8 and 9, respectively, which are integral with the drive shaft. Portions 8 and 9 may be either machined out of the drive shaft or may be separate elements which are welded or otherwise rigidly secured to the drive shaft. The former is preferable since the latter may have the effect of weakening or stressing the shaft. The specific strain gauge construction forms no part of our present invention, hence the strain gauge per se will be only briefly described. A complete description of one suitable form of strain gauge can be found in the copending applications of E. H. Lamberger and B. F. Langer, filed April 18, 1939, Serial No. 268,500, now Patent No. 2,275,532, issued March 10, 1942, entitled Oil well strain gauges and that of S. L. Burgwin and B. F. Langer, filed February 25, 1939, Serial No. 258,510, now Patent No. 2,231,702, issued February 11, 1941, entitled Strain gauges. Briefly, the strain gauge as will be seen from an inspection of Fig. 3 comprises two relatively movable elements, the first being a pair of E-shaped cores 10 interconnected by nonmagnetic material (not shown) upon which cores are mounted a pair of impedance coils 11 and 12 and the second being a magnetic piece 13 which is normally equidistantly spaced from the projecting ends of the cores so that movement towards one of such ends and away from the other of such ends will change the relative impedance of the two coils. By connecting these two coils to an impedance or resistance coil 14, and by connecting a suitable indicating or recording meter 15, such as an alternating current milliammeter, to a central point between coils 11 and 12 and to a central portion of coil 14, it will be readily apparent that an electrical bridge is formed in which each half of coil 14 forms a leg and each coil 11 and 12 forms another leg and in which meter 15 is included in the neutral leg. By suitably calibrating meter 15 in pound units, for example, the thrust or compression of the drive shaft as the result of propeller thrust can be readily measured.

In accordance with the showings of the above-mentioned patents, it will be apparent that the relatively movable parts 10 and 13 of the strain gauges are respectively connected intermediate portions of the apparatus being examined. For example, the cores 10 of the gauge may be secured to the part 5 and the armature 13 to the part 4, or vice versa, whereby relative movement between the parts 4 and 5 due to axial thrust will cause relative movement between the parts 10 and 13 of the gauge.

Referring again to Fig. 1 which shows only a part of the connections illustrated in Fig. 3 (the meters and external impedance coils being omitted for simplicity), it will be noted that the strain gauges 2 and 3 are connected to slip rings 18 and 19 which slip rings are insulatingly secured by rings 17 and 17' to the drive shaft. A pair of current collectors or brushes 18' and 19' are connected to a source of alternating current (not shown). Slip rings 29 and 30 are connected to a common tap to each of the pair of gauges 2—3 and 23—23'. While we have shown a pair of magnetic strain gauges supported at diametrically opposite portions of the drive shaft, we wish to make it clear that only a single magnetic strain gauge would be sufficient to indicate thrust. However, in order to compensate for bending of the shaft, we prefer to use two or even more magnetic strain gauges which are supported at equally spaced locations around the circumference of the drive shaft so that upon bending of the drive shaft, some would tend to record a value which is greater than the actual thrust and the others will tend to record a value which is less than the actual thrust, thereby compensating each other and effecting a resultant true reading of the thrust on the drive shaft. It will be noted that the relatively movable portions 10 and 13 of the strain gauge could be rigidly secured to arms 4—5 and 6—7. However, this introduces an error in the event that there is torque on the drive shaft at the same time that there is thrust, in which case the torque would tend to longitudinally displace arms 4 and 5 or arms 6 and 7, hence tending to give a reading on the thrust gauge which is a function of both thrust and torque instead of thrust alone. Since the strain of the shaft is ordinarily greater in torque than in thrust the torque responsive strain gauges are adjusted to provide a greater amount of relative movement between the armature and core members, than are the thrust responsive strain gauges, hence, the thrust responsive strain gauges are usually more sensitive to slight strains than the torque responsive strain gauges. In addition shaft shortening due to torque or shaft wind up is easily detected by the thrust responsive strain gauges since the strain is substantially in a direction which the thrust strain gauges are adjusted to detect. Straining of the shaft as a result of tension or compression stresses is not readily detected by the torque responsive strain gauges because the strain is at substantially a right angle to the strain resulting from torque and, as previously mentioned, the torque strain gauges are not adjusted as finely as the thrust strain gauges.

In order to overcome this tendency of the strain gauges to respond to shaft strains other than those they are positioned to detect, particularly in the case of the thrust strain gauges, we have provided a yieldable interconnecting means such as shown in Figs. 2 and 4 comprised essentially of a plurality of stiff spring elements 20, 21 and 22. While spring elements such as 20, 21 and 22 are also shown on the torque responsive strain gauges 23 and 23', these are not absolutely necessary and may be omitted since the error introduced by virtue of thrust is negligible. The effect of these spring elements will be to provide an axis of movement A—A, Fig. 4, about which the ends of the magnetic strain gauge move as a pivot in response to a strain resulting from torque developed in the drive shaft in the case of the thrust strain gauges, and in response to a shaft strain resulting from thrust in the case of the torque strain gauges. Fig. 2a shows the manner in which the spring elements supporting a thrust strain gauge flex as the result of torque. In this manner the thrust sensitive strain gauge will be responsive to thrust alone and not to torque in addition. An outstanding advantage in using our yieldable interconnecting means instead of an ordinary hinged joint is that no friction at the joint, which is variable in nature, will be encountered and which would introduce error in the system. So far only the means of measuring thrust has been considered.

In addition, a similar means for indicating torque is provided comprising a pair of strain gauges which are mounted on diametrically opposite portions of the drive shaft, only one, namely 23, being shown; the other, of course, being hidden on the opposite side of the drive shaft. The ends of strain gauge 23 are secured by arms 24 and 25 to outstanding ring elements 26 and 27 of the drive shaft, but at peripherally as well as longitudinally spaced points. Furthermore, the strain gauge is mounted peripherally instead of longitudinally of the drive shaft. The electrical strain gauge is schematically indicated as 23 and 23' in Fig. 3, representing both pairs of coils on diametrically opposite portions of the drive shaft, and the torque gauge or meter is denoted by numeral 28 which may be of the same type as meter 15, but which is calibrated in foot pounds or other units of torque. The electrical connections for the indication of torque are the same as those for the indication of thrust as will be readily apparent from Fig. 3.

The shaft is preferably made hollow so that by suitable choice of the diameter and wall thickness the deflections in all four gauges can be brought to a value to which the gauges are well adapted without over-stressing the shaft material. For example, in a solid shaft the compressive stress would probably be small compared to the torsional stress, but by increasing the diameter of the shaft and making it hollow, the ratio of torsional stress to compressive stress is reduced. If the resulting shaft has a thin wall, it is preferable to leave collars of thicker material as shown in Fig. 1 for attachment of the gauges.

Our metering apparatus can also be used for direct reading of horsepower as illustrated in Fig. 5. The current otherwise flowing through meter 28 in Fig. 3, instead, can be rectified by a copper-copper-oxide type rectifier 31 and conducted through the moving coil 32 of a watt meter 33. If then the field coil 34 of the watt meter is energized by a direct current generator G₁, coupled to the propeller shaft and the voltage of which is proportional to the speed of the shaft, the reading of the watt meter will be proportional to the power being transmitted by the propeller.

Similarly, the current otherwise flowing through meter 15 in Fig. 3 can be rectified by a rectifier 35 and conducted through the moving coil 36 of a watt meter 37. If then the field coil 38 is energized by a direct current generator G₂, the voltage of which is proportional to the speed of a speedometer shaft which indicates the linear speed of a ship (or an airplane), the watt meter reading will be an indication of thrust horsepower.

The efficiency of the propeller is the ratio of thrust horsepower to torque horsepower and can be measured in the following way. Watt meter 37 is provided with a cam 39 of substantially the shape of a logarithmic spiral along which a flexible member 40 is wound. Similarly, the watt meter 33 is provided with a cam member 41 having a shape substantially the same as that of cam 39 and upon which a flexible member 42 is wound. A scale 43 is graduated in accordance with the scale of logarithms but is calibrated for indicating efficiency. That is, the divisions are spaced in accordance with a scale of logarithmic values and the values of thrust divided by torque (or efficiency) marked adjacent the positions of corresponding logarithmic values.

If the cam members 39 and 41 are so proportioned that the scale 43 and the pointer 44 are respectively moved in accordance with the logarithms of the displacements of the pointer shafts of watt meters 37 and 33, the pointer 44 will cooperate with the scale 43 to indicate a value which corresponds to the difference of the logarithms. However, since the difference of the logarithms of two numbers is equal to the logarithms of the quotient of the numbers the pointer 44 will indicate in cooperation with the scale, the ratio of thrust horsepower to torque horsepower, namely the efficiency of a propeller. Watt meter 37 moves counterclockwise with increasing horsepower, whereas, watt meter 33 moves clockwise with increased horsepower, as indicated by the scale calibration.

We are, of course, aware that others, particularly after having had the benefit of the teachings of our invention, may devise other devices embodying our invention, and we, therefore, do not wish to be limited to the specific showings made in the drawings and the descriptive disclosure hereinbefore made, but wish to be limited only by the scope of the appended claims.

We claim as our invention:

1. Apparatus for measuring the ratio of thrust to torque of a drive shaft, comprising, in combination, a hollow drive shaft having a plurality of outstanding ring portions, a magnetic strain gauge having a pair of impedance coils wound on supporting cores, which cores are secured to one of said rings, and a magnetic piece which is secured longitudinally of the shaft axis on another of said ring portions, a second magnetic strain gauge having a pair of impedance coils wound on supporting cores, which cores are secured to one of said rings, and a magnetic piece which is secured longitudinally and peripherally of the shaft axis on another of said ring portions, electrical bridge circuits each including a pair of impedance arms, each of said magnetic strain gauges having its impedance coils electrically connected to a pair of impedance arms in one of said electrical bridge circuits, thereby completing said electrical bridge circuits, a meter connected in the neutral arm of each of said electrical bridge circuits for measuring the amount of movement of the magnetic piece with respect to the core structures of the associated strain gauge, thereby indicating, respectively, the thrust and torque on the drive shaft, and a ratio meter operable in response to the logarithmic difference in deflection of said meters for indicating the ratio of thrust to torque.

2. Apparatus for measuring the ratio of thrust to torque of a drive shaft, comprising, in combination, a hollow drive shaft having a plurality of outstanding ring portions, a pair of magnetic strain gauges, each having a pair of impedance coils wound on supporting cores, which cores are secured to one of said rings, and a magnetic piece which is secured longitudinally of the shaft axis on another of said ring portions, a second pair of magnetic strain gauges, each having a pair of impedance coils wound on supporting cores, which cores are secured to one of said rings, and a magnetic piece which is secured longitudinally and peripherally of the shaft axis on another of said ring portions, electrical bridge circuits each including a pair of impedance coils, each of said pairs of magnetic strain gauges, having the impedance coils thereof electrically connected to a pair of impedance arms in one of said electrical bridge circuits, thereby completing said electrical bridge circuits, a meter connected in the neutral arm of each of said electrical bridge circuits for measuring the amount of movement of the magnetic pieces with respect to the core structures of the pairs of strain gauges, thereby indicating, respectively, the thrust and torque on the drive shaft, and a ratio meter operable in response to the logarithmic difference in deflection of said meters for indicating the ratio of thrust to torque.

3. Apparatus for measuring efficiency of a propeller shaft comprising means including a magnetic strain gauge mounted longitudinally of the shaft axis and having relatively movable ends connected to longitudinally spaced portions of said shaft, a second magnetic strain gauge peripherally mounted on said shaft and having relatively movable ends connected to longitudinally and peripherally spaced portions of said shaft, separate circuit means for each of said magnetic strain gauges respectively including an electrical bridge circuit and a dynamometer type wattmeter having a movable coil and a stationary coil, a direct current generator coupled to said propeller shaft for energizing the stationary coil of one of said wattmeters so as to make such wattmeter indicative of torque horsepower, a speedometer shaft whose rotational speed is indicative of the linear speed of the ship, a direct current generator coupled to said speedometer shaft for energizing the stationary coil of the other of said wattmeters so as to make such wattmeter indicative of thrust horsepower, a ratio meter responsive to said wattmeters for indicating the ratio of thrust horsepower to torque horsepower, hence for indicating the efficiency of the propeller.

4. Apparatus as claimed in claim 3, wherein said ratio meter includes parts for logarithmically subtracting the deflection of said wattmeters for indicating the ratio of thrust horsepower to torque horsepower.

5. Apparatus for measuring the efficiency of a propeller shaft comprising a magnetic strain gauge mounted longitudinally of the shaft and having relatively movable ends connected to longitudinally spaced portions of the shaft, a second magnetic strain gauge peripherally mounted on said shaft and having relatively movable ends connected to longitudinally and peripherally spaced portions of the shaft, means responsive to the amount of movement of the ends of said first gauge and the linear speed of said shaft for measuring the thrust horsepower of said shaft, means responsive to the amount of movement of the ends of said second gauge and the rotational speed of said shaft for measuring the torque horsepower of said shaft, and means responsive to both of said last named means for indicating the ratio of thrust horsepower to torque horsepower.

6. Apparatus for measuring the thrust of a drive shaft comprising, in combination, a hollow drive shaft having a plurality of spaced outstanding ring portions, a magnetic strain gauge extending longitudinally of the shaft and having relatively movable ends, said gauge comprising a core structure secured to one of said ends and a magnetic piece secured to the other of said ends, and means connecting said ends respectively to different ones of said ring portions comprising a plurality of crossed leaf springs respectively having connections with one of said ends and with one of said ring portions to provide a resilient pivotal connection for each of said ends with one of said ring portions.

7. Apparatus for measuring the torque of a drive shaft comprising, in combination, a hollow drive shaft having a plurality of spaced outstanding ring portions, a magnetic strain gauge extending peripherally of the shaft and having relatively movable ends, said gauge comprising a core structure secured to one of said ends and a magnetic piece secured to the other of said ends, and means connecting said ends respectively to different ones of said ring portions at longitudinally and peripherally spaced points including a plurality of crossed leaf springs respectively having connections with one of said ends and with one of said ring portions to provide a resilient pivotal connection for each of said ends with one of said ring portions.

BERNARD F. LANGER.
HARRY C. WERNER.